United States Patent
Demsky

(10) Patent No.: US 6,941,071 B2
(45) Date of Patent: Sep. 6, 2005

(54) TEST METHOD AND APPARATUS FOR PARALLEL OPTICAL TRANSCEIVERS USING SERIAL EQUIPMENT

(75) Inventor: Kevin Paul Demsky, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 09/865,260

(22) Filed: May 25, 2001

(65) Prior Publication Data

US 2002/0176128 A1 Nov. 28, 2002

(51) Int. Cl.[7] .......................... H04B 10/08; H04B 10/00
(52) U.S. Cl. .............................. 398/22; 398/23; 398/24; 398/25; 398/33; 398/135; 398/138; 398/139
(58) Field of Search .................................. 398/9, 22–33, 398/135–137, 138, 139; 385/89

(56) References Cited

U.S. PATENT DOCUMENTS 4,850,045 A * 7/1989 Funke .......................... 398/16
5,345,230 A * 9/1994 Jackson et al. ............. 340/3.51
6,208,621 B1 * 3/2001 Ducaroir et al. ............. 370/241
6,735,731 B2 * 5/2004 Ewen et al. ................. 714/733
2002/0145779 A1 * 10/2002 Strasser et al. ............. 359/124

* cited by examiner

Primary Examiner—M. R. Sedighian
(74) Attorney, Agent, or Firm—Joan Pennington

(57) ABSTRACT

A test method and apparatus are provided for testing parallel optical transceivers. Each of a plurality of channels of the parallel optical transceiver is connected in series. A predefined data pattern is applied to a first channel of the series connected plurality of channels. An output is detected from a last channel of the series connected plurality of channels and compared the applied predefined data pattern to identify operation of the parallel optical transceiver. An optical wrap plug and an electrical wrap plug are used for connecting in series the plurality of channels of the parallel optical transceiver. The optical wrap plug includes a plurality of optical connectors for respectively optically connecting each respective channel transmitter to a next respective channel receiver. The electrical wrap plug includes a plurality of electrical connectors for respectively electrically connecting a respective channel receiver to a corresponding respective channel transmitter.

18 Claims, 3 Drawing Sheets

TEST METHOD AND APPARATUS FOR PARALLEL OPTICAL TRANSCEIVERS USING SERIAL EQUIPMENT

FIELD OF THE INVENTION

The present invention relates generally to the data processing field, and more particularly, relates to a test method and apparatus for testing parallel optical transceivers using serial equipment.

DESCRIPTION OF THE RELATED ART

Manufacturing and testing a parallel optical transceiver can be difficult for several reasons. A parallel optical transceiver is made up of parts that do not have yields comparable to circuit boards or complementary metal oxide semiconductor (CMOS) processing with similar integration levels. Optical to electrical conversion at greater than 1 Gbit/s is typically facilitated by GaAs, or other III/V compounds or other exotic materials. For a twelve channel parallel optical transceiver product, the packaging process of 12 lasers, 12 optical receivers, 12 laser drivers, and 12 post amplifiers can involve many bonding and gluing operations, and also exotic packaging techniques. Yield is therefore a problem with parallel optical transceivers.

Mass producing a module or product that includes a combination of several components that do no yield well individually will cause all of the individual yields to be multiplied together, resulting in an even lower yield for the combined part.

In a production line, when the combined module is built and adjusted to a point where the module should be functional, it is desirable to test the module to determine that the module is functional. Such preliminary testing should identify if the manufacturing process can continue, or if the module should be scrapped, reworked or sent to another manufacturing line for testing and readjusting channels individually. It is desirable to provide such testing quickly so that manufacturing time could be saved. However, testing each of the parallel channels typically is very time consuming and requires complex, cumbersome and costly test equipment.

When manufacture of a parallel optical transceiver is completed, the problem of quickly testing the parallel optical transceiver in the field is the same as during manufacture. To test the parallel optical transceiver, each of the parallel channels typically must be separately done using the same type of complex, cumbersome and costly test equipment used during manufacture.

A need exists for an improved test method and apparatus for testing parallel optical transceivers.

SUMMARY OF THE INVENTION

A principal object of the present invention is to provide a test method and apparatus for testing parallel optical transceivers. Other important objects of the present invention are to provide such test method and apparatus for testing parallel optical transceivers substantially without negative effect and that overcome many of the disadvantages of prior art arrangements.

In brief, a test method and apparatus are provided for testing parallel optical transceivers. Each of a plurality of channels of the parallel optical transceiver is connected in series. A predefined data pattern is applied to a first channel of the series connected plurality of channels. An output is detected from a last channel of the series connected plurality of channels and compared the applied predefined data pattern to identify operation of the parallel optical transceiver.

In accordance with features of the invention, an optical wrap plug and an electrical wrap plug are used for connecting in series the plurality of channels of the parallel optical transceiver. The optical wrap plug includes a plurality of optical connectors for respectively optically connecting each respective channel transmitter to a next respective channel receiver. The electrical wrap plug includes a plurality of electrical connectors for respectively electrically connecting a respective channel receiver to a corresponding respective channel transmitter.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
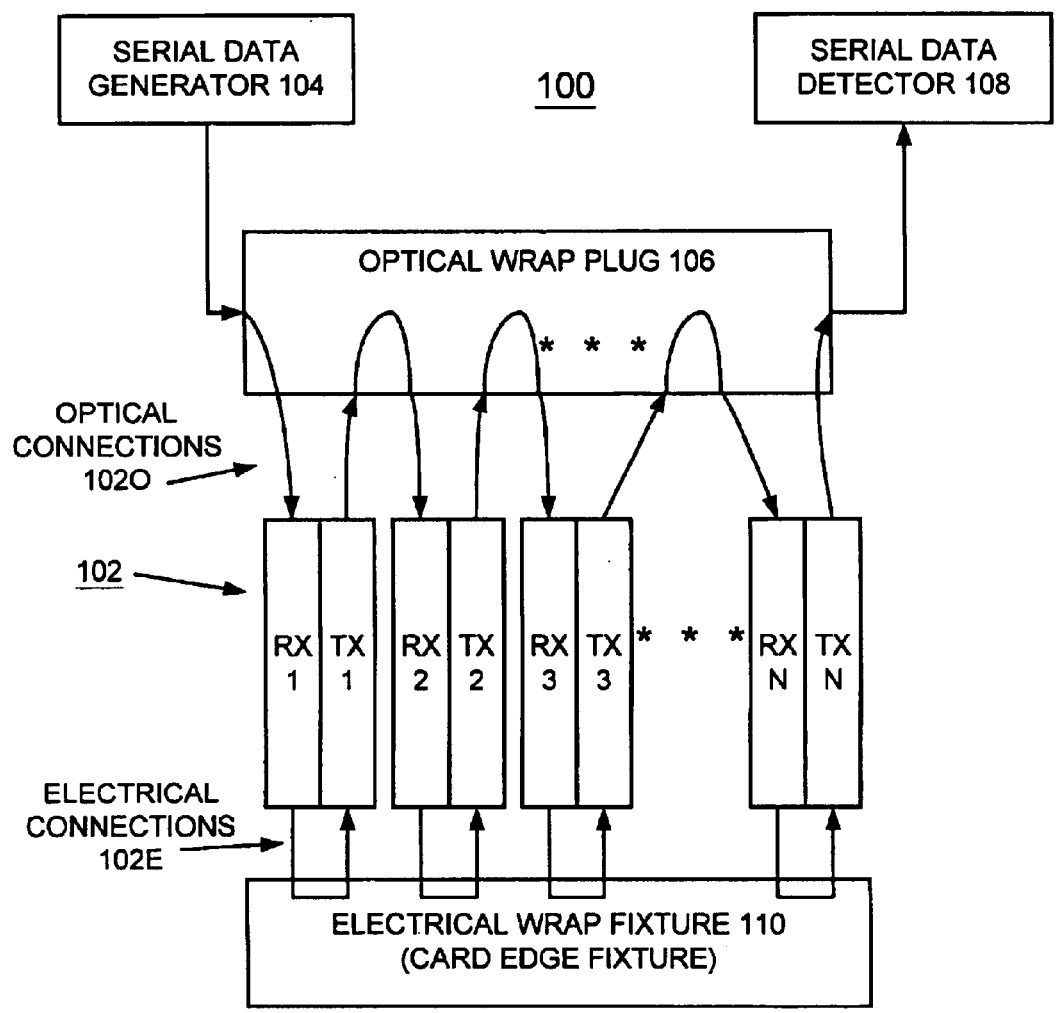
FIG. 1 is a block diagram representation illustrating a test system for testing a parallel optical transceiver in accordance with the preferred embodiment.

Having reference now to the drawings, in FIG. 1, there is shown a test system of the preferred embodiment generally designated by the reference character 100. Test system 100 of the preferred embodiment is used for testing a parallel optical transceiver generally designated by the reference character 102. The parallel optical transceiver 102 includes a plurality of parallel receiver and transmitter channels 1-N, each labeled RX, TX.

In accordance with features of the preferred embodiment, test system 100 enables effectively and efficiently testing of the parallel optical transceiver 102 including each of the plurality of parallel channels RX, TX 1-N using serial equipment. A predefined data pattern is applied to the parallel optical transceiver 102. The predefined data pattern passes through the plurality of parallel channels RX, TX 1-N, with each of the parallel channels connected in series. A serial data detector detects an output of the parallel optical transceiver 102 and compares the detected data output with the applied predefined data pattern to determine whether the parallel optical transceiver is functional. If the output data pattern matches the applied predefined data pattern, then the parallel optical transceiver 102 is functional with all of the plurality of parallel channels RX, TX 1-N functioning properly. If the output data pattern does not match the applied predefined data pattern, then the parallel optical transceiver 102 is not functioning properly with possibly one or more of the plurality of parallel channels RX, TX 1-N having failed.

As shown in FIG. 1, test system 100 includes a serial data generator 104, an optical wrap plug 106, and a serial data detector 108. The serial data generator 104 provides a serial data test signal or predefined data pattern that is applied to the optical wrap plug 106. Optical wrap plug 106 provides optical connections generally designated by 102O between each of the plurality of parallel channels RX, TX 1-N, with each of the parallel channels connected in series. As shown, the optical wrap plug 106 connects the serial data generator 104 to RX1, respectively connects TX1 to RX2; TX2 to RX3, TX3 to RXN, and TXN to the serial data detector 108. A serial data path is provided between a first transceiver optical input RX1 to a last transceiver optical output TXN. An electrical wrap plug 110 provides respective electrical connections generally designated by 102E between the parallel channels RX, TX 1-N. Respective electrical connections 102E are provided between each of the plurality of parallel channels RX, TX 1-N. Each of the parallel channels RX, TX 1-N is connected in series with the electrical wrap plug 110 respectively connecting RX1 to TX1, RX2 to TX2, RX3 to TX3, and RNX to TXN, as shown.

In operation, the serial data generator 104 applies a predefined data pattern to the parallel optical transceiver 102 via the optical wrap plug 106. The optical wrap plug 106 couples the predefined data pattern from the serial data generator 104 to RX1. The electrical wrap connector 110 connects the electrical outputs of the respective parallel channel receiver RX to the corresponding parallel channel transmitter TX. The optical wrap plug 106 connects the optical outputs of the respective parallel channel transmitter TX to a next parallel channel receiver RX. The predefined data pattern applied to first parallel channel receiver RX1 goes through all the series connected parallel channels RX, TX 1-N and is coupled from the last parallel channel transmitter TXN in the parallel optical transceiver 102 to the serial data detector 108 via the optical wrap plug 106.

The serial data detector 108 detects the output of the parallel optical transceiver 102 and compares the detected data output with the applied predefined data pattern to determine whether the parallel optical transceiver 102 is functional. When the parallel optical transceiver 102 is operating correctly, then the serial data detector 108 detects that the output data pattern matches the applied predefined data pattern. When the parallel optical transceiver 102 has failed, then the serial data detector 108 detects that the output data pattern does not match the applied predefined data pattern. While diagnostic information for individual channels is not provided by test system 100, if the data pattern comes out in the same form it went into the parallel optical transceiver 102, then all channels are working. Also if the optical output has a $10^{-12}$ bit error rate then the bit error rate for each channel would not be greater than the $10^{-12}$ bit error rate.

Figure 2:
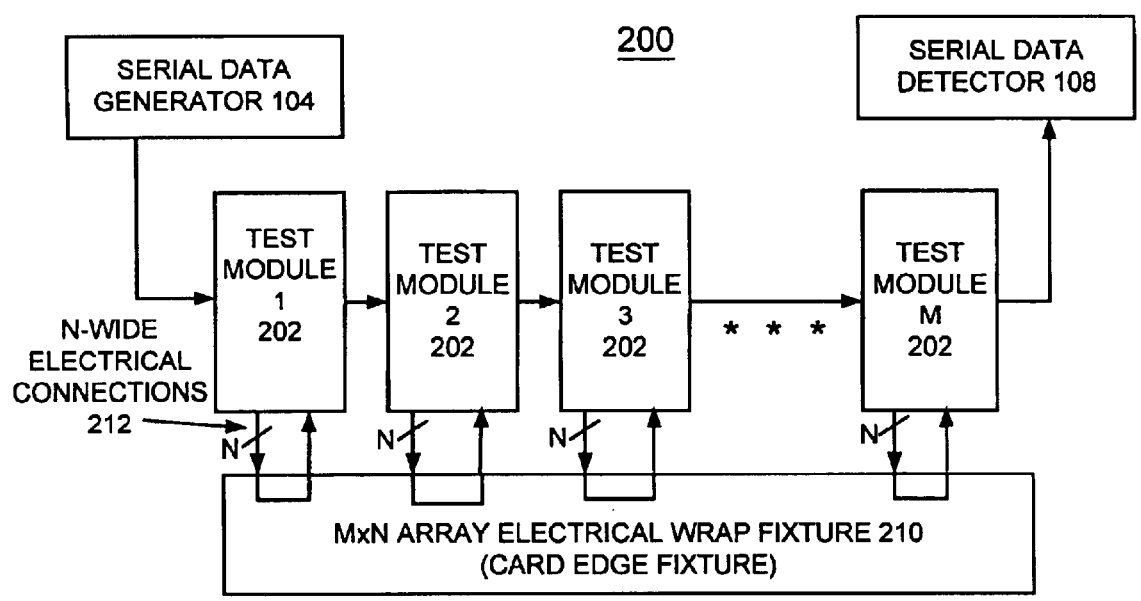
FIG. 2 is a block diagram representation illustrating an alternative arrangement for testing multiple parallel optical transceivers in accordance with the preferred embodiment.

Referring now to FIG. 2, there is shown an alternative arrangement for testing multiple parallel optical transceivers in accordance with the preferred embodiment generally designated by the reference character 200. In FIG. 2, the same reference characters are used for identical or similar components as used for the test system 100 of FIG. 1. Testing apparatus 200 enables simultaneously testing multiple parallel optical transceivers 102. Testing apparatus 200 includes a serial data generator 104 and a serial data detector 108. A plurality of test modules 1-M, 202 is connected in series between the serial data generator 104 and the serial data detector 108. Each of the plurality of test modules 1-M, 202 includes a parallel optical transceiver 102 connected together with an optical wrap plug 106, as shown in FIG. 1. An M×N array electrical wrap fixture 210 connects all of the plurality of test modules 1-M, 202. N-wide electrical connections 212 are provided by the M×N array electrical wrap fixture 210 for connecting all of the plurality of parallel channels RX, TX 1-N as shown in FIG. 1, of each respective parallel optical transceiver 102 of each respective test module 1-M, 202. Each of the channels RX, TX, 1-N of parallel optical transceiver 102 included in each test module 202 is connected together as shown in FIG. 1.

In operation, the serial data generator 104 applies a predefined data pattern to the first test module 1, 202. The predefined data pattern is provided to the next serial test module 2, 202. The predefined data pattern is provided in a serial fashion though each of the modules 1-M, 202. The serial data detector 108 detects the output of the test module M, 202 and compares the detected data output with the applied predefined data pattern to determine whether the test modules 1-M, 202 are functional. When the test modules 1-M, 202 are operating correctly, then the serial data detector 108 detects that the output data pattern matches the applied predefined data pattern. When the test modules 1-M, 202 have failed, then the serial data detector 108 detects that the output data pattern does not match the applied predefined data pattern.

Figure 3:
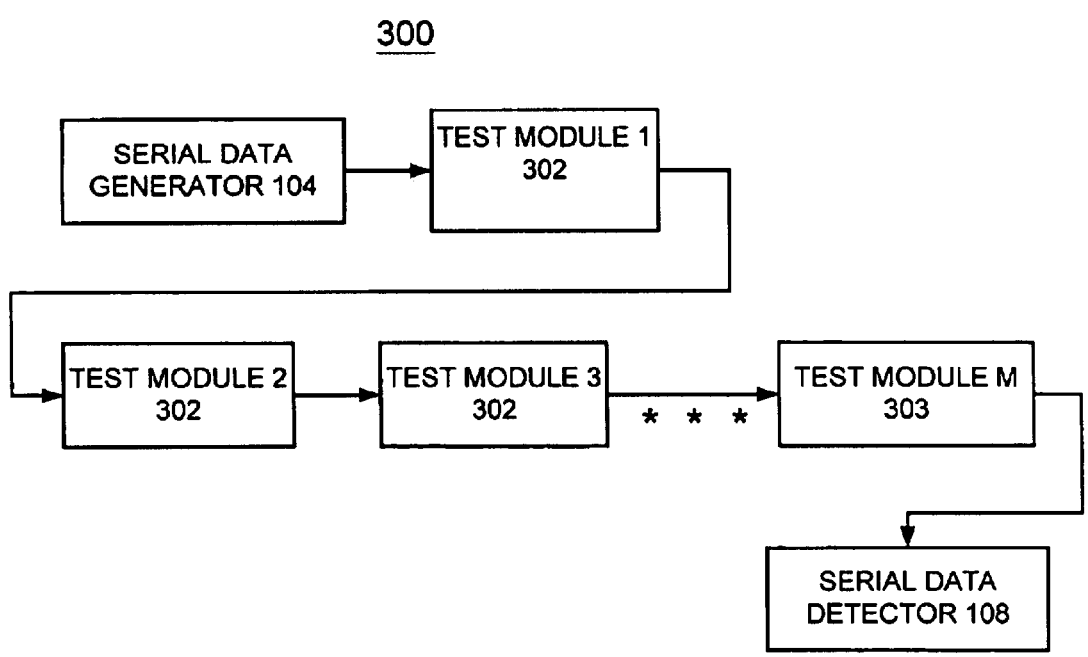
FIG. 3 is a block diagram representation illustrating a further alternative arrangement for testing multiple parallel optical transceivers in accordance with the preferred embodiment.

FIG. 3 is a block diagram representation illustrating a further alternative arrangement for testing multiple parallel optical transceivers in accordance with the preferred embodiment. In FIG. 3, the same reference characters are used for identical or similar components as used for the test system 100 of FIG. 1. Testing apparatus 300 enables simultaneously testing multiple parallel optical transceivers 102. Testing apparatus 300 includes a serial data generator 104 and a serial data detector 108. A plurality of test modules 1-M, 302 is connected in series between the serial data generator 104 and the serial data detector 108. Each of the test modules 1-M, 302 includes a parallel optical transceiver 102 connected together with an optical wrap plug 106 and an electrical wrap fixture 110 as shown in FIG. 1. Each of the channels RX, TX, 1-N of parallel optical transceiver 102 included in each of the test modules 1-M, 302 is connected together as shown in FIG. 1.

In operation, the serial data generator 104 applies a predefined data pattern to the first test module 1, 302. The predefined data pattern is provided to the next serial test module 2, 302. The predefined data pattern is provided in a serial fashion though each of the modules 1-M, 302. The serial data detector 108 detects the output of the test module M, 302 and compares the detected data output with the applied predefined data pattern to determine whether the test modules 1-M, 302 are functional. When the test modules 1-M, 302 are operating correctly, then the serial data detector 108 detects that the output data pattern matches the applied predefined data pattern. When the test modules 1-M, 202 have failed, then the serial data detector 108 detects that the output data pattern does not match the applied predefined data pattern.

While the present invention has been described with reference to the details of the embodiments of the invention shown in the drawing, these details are not intended to limit the scope of the invention as claimed in the appended claims.

What is claimed is:

1. A method for testing a parallel optical transceiver comprising the steps of:

providig an optical wrap plug and an electrical wrap plug for connecting in series each of a plurality of parallel receiver and transmitter channels of said parallel optical transceiver;

respectively optically connecting each respective channel transmitter to a next respective channel receiver in said series of said plurality of said parallel receiver and transmitter channels using said optical wrap plug;

respectively electrically connecting said channel receiver and said channel transmitter of each said parallel receiver and transmitter channels using said electrical wrap plug;

applying a predefined data pattern to a first channel of said series connected plurality of parallel receiver and transmitter channels;

detecting an output from a last channel of said series connected plurality of parallel receiver and transmitter channels; and comparing said applied predefined data pattern with said output to identify functional operation of said parallel optical transceiver.

2. A method for testing a parallel optical transceiver as recited in claim 1 wherein the step of applying a predefined data pattern to a first channel of said series connected plurality of parallel receiver and transmitter channels includes the step of applying said predefined data pattern to said channel receiver of said first channel using said optical wrap plug.

3. A method for testing a parallel optical transceiver comprising the steps of:

providing an optical wrap plug and an electrical wrap plug for connecting in series each of a plurality of parallel receiver and transmitter channels of said parallel optical transceiver;

respectively optically connecting each respective channel transmitter to a next respective channel receiver in said series of said plurality of said parallel receiver and transmitter channels using said optical wrap plug;

respectively electrically connecting said channel receiver and said channel transmitter of each said parallel receiver and transmitter channels using said electrical wrap plug;

applying a predefined data pattern to a first channel of said series connected plurality of channels including the steps of generating said predefined data pattern utilizing a serial data generator and applying said predefined data pattern to a first channel receiver of said series connected plurality of channels;

detecting an output from a last channel of said series connected plurality of channels; and comparing said applied predefined data pattern with said output to identify operation of said parallel optical transceiver.

4. A method for testing a parallel optical transceiver as recited in claim 3 wherein the step of detecting an output from a last channel of said series connected plurality of channels includes the steps of detecting an output utilizing a serial data detector connected to a last channel transmitter of said series connected plurality of channels.

5. A method for testing a parallel optical transceiver as recited in claim 3 wherein the step of comparing said applied predefined data pattern with said output to identify operation of said parallel optical transceiver includes the steps of comparing said applied predefined data pattern with said output and identifying a match to identify correct operation of said parallel optical transceiver.

6. A method for testing a parallel optical transceiver as recited in claim 3 wherein the step of comparing said applied predefined data pattern with said output to identify operation of said parallel optical transceiver includes the steps of comparing said applied predefined data pattern with said output and identifying failed operation of said parallel optical transceiver responsive to no match of said compared predefined data pattern with said output.

7. A method for testing a parallel optical transceiver as recited in claim 1 includes the steps of connecting a plurality of parallel optical transceivers in series; wherein the step of providing an optical wrap plug and an electrical wrap plug for connecting in series each of a plurality of parallel receiver and transmitter channels of said parallel optical transceiver is provided for each of said series connected parallel optical transceivers; and wherein the step of detecting an output from said last channel of said series connected plurality of parallel receiver and transmitter channels includes the step of detecting an output from said last channel of said series connected plurality of parallel receiver and transmitter channels from a last one of said series connected parallel optical transceivers.

8. A method for testing a parallel optical transceiver as recited in claim 3 includes the steps of connecting a plurality of parallel optical transceivers in series, and wherein the step of applying a predefined data pattern to a first channel of said series connected plurality of parallel receiver and transmitter channels includes the steps of applying said predefined data pattern to a first channel receiver of said series connected plurality of parallel receiver and transmitter channels of a first one of said series connected parallel optical transceivers.

9. A method for testing a parallel optical transceiver as recited in claim 8 wherein the step of comparing said applied predefined data pattern with said output to identify operation of said parallel optical transceiver includes the steps of comparing said applied predefined data pattern with said output and identifying a match to identify correct operation of each said series connected parallel optical transceivers.

10. A method for testing a parallel optical transceiver as recited in claim 8 wherein the step of comparing said applied predefined data pattern with said output to identify operation of said parallel optical transceiver includes the steps of comparing said applied predefined data pattern with said output and identifying failed operation of said series connected parallel optical transceivers responsive to no match of said compared predefined data pattern with said output.

11. Apparatus for testing a parallel optical transceiver comprising:

an optical wrap plug and an electrical wrap plug, each including a plurality of connectors for connecting in series each of a plurality of parallel receiver and transmitter channels of said parallel optical transceiver; said optical wrap plug respectively optically connecting each respective channel transmitter to a next respective channel receiver in said series of said plurality of said parallel receiver and transmitter channels using; said electrical wrap plug respectively electrically connecting said channel receiver and said channel transmitter of each said parallel receiver and transmitter channels;

a serial data generator for applying a predefined data pattern to a first channel of said series connected plurality of parallel receiver and transmitter channels using said optical wrap plug; and a serial data detector for detecting an output from a last channel of said series connected plurality of parallel receiver and transmitter channels using said optical wrap plug; and said serial data detector for comparing said applied predefined data pattern with said output to identify functional operation of said parallel optical transceiver.

12. Apparatus for testing a parallel optical transceiver comprising:

an optical wrap plug and an electrical wrap plug, each including a plurality of connectors for connecting in series each of a plurality of parallel receiver and transmitter channels of said parallel optical transceiver; said optical wrap plug respectively optically connecting each respective channel transmitter to a next respective channel receiver in said series of said plurality of said parallel receiver and transmitter channels using; said electrical wrap plug respectively electrically connecting said channel receiver and said channel transmitter of each said parallel receiver and transmitter channels;

a serial data generator for applying a predefined data pattern to a first channel of said series connected plurality of parallel receiver and transmitter channels; and a serial data detector for detecting an output from a last channel of said series connected plurality of parallel receiver and transmitter channels and for comparing said applied predefined data pattern with said output to identify operation of said parallel optical transceiver.

13. Apparatus for testing a parallel optical transceiver as recited in claim 12 wherein said predefined data pattern is applied to said channel receiver of said first parallel receiver and transmitter channel using said optical wrap plug.

14. Apparatus for testing a parallel optical transceiver as recited in claim 12 wherein said outout from a last channel of said series connected plurality of parallel receiver and transmitter channels is detected using said optical wrap plug.

15. Apparatus for testing a parallel optical transceiver as recited in claim 14 wherein said electrical wrap plug includes a serial data detector for comparing said applied predefined data pattern with said output and for identifying failed operation of said parallel optical transceiver responsive to no match of said compared predefined data pattern with said output.

16. Apparatus for testing a parallel optical transceiver as recited in claim 12 wherein said serial data generator for applying said predefined data pattern to said first channel of said series connected plurality of channels includes an optical connection to said first channel of said series connected plurality of channels.

17. Apparatus for testing a parallel optical transceiver as recited in claim 12 wherein said serial data detector for detecting an output from a last channel of said series connected plurality of channels and for comparing said applied predefined data pattern with said output to identify operation of said parallel optical transceiver includes an optical connection to said last channel of said series connected plurality of channels.

18. A method for testing a plurality of parallel optical transceivers comprising the steps of:

providing an optical wrap plug and an electrical wrap plug for connecting in series each of a plurality of parallel receiver and transmitter channels of each of said parallel optical transceivers;

respectively optically connecting each respective channel transmitter to a next respective channel receiver in said series of said plurality of said parallel receiver and transmitter channels using said optical wrap plug;

respectively electrically connecting said channel receiver and said channel transmitter of each said parallel receiver and transmitter channels using said electrical wrap plug;

connecting in series each of said parallel optical transceivers;

applying a predefined data pattern to a first channel of a first one of said series connected plurality of parallel optical transceivers including the steps of generating said predefined data pattern utilizing a serial data generator and applying said predefined data pattern to a first channel receiver of said series connected plurality of parallel receiver and transmitter channels;

detecting an output from a last channel of a last one of said series connected plurality of parallel optical transceivers; and comparing said applied predefined data pattern with said output to identify functional operation of said plurality of parallel optical transceivers.

* * * * *